United States Patent
Higashiyama

(10) Patent No.: US 6,897,865 B2
(45) Date of Patent: May 24, 2005

(54) THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

(75) Inventor: Makoto Higashiyama, Sakurai (JP)

(73) Assignee: Konami Corporation, Tokyo (JP)

( * ) Notice: Subject to any disclaimer, the term of this patent is extended or adjusted under 35 U.S.C. 154(b) by 93 days.

(21) Appl. No.: 09/960,670

(22) Filed: Sep. 21, 2001

(65) Prior Publication Data

US 2002/0036638 A1 Mar. 28, 2002

(30) Foreign Application Priority Data

Sep. 25, 2000 (JP) ........................................ 2000-290170

(51) Int. Cl.$^7$ ............................................. G06T 15/60
(52) U.S. Cl. ........................................................ 345/426
(58) Field of Search ................................. 345/418–428, 345/473

(56) References Cited

U.S. PATENT DOCUMENTS

| 4,600,200 A | 7/1986 | Oka et al. |
| 5,422,986 A | 6/1995 | Neely |
| 6,356,264 B1 * | 3/2002 | Yasui et al. ................. 345/426 |
| 6,529,194 B1 * | 3/2003 | Yamaguchi ................. 345/426 |
| 6,542,151 B1 * | 4/2003 | Minami et al. ............. 345/419 |

FOREIGN PATENT DOCUMENTS

EP 0702333 3/1996

OTHER PUBLICATIONS

Eo K S et al: "Hybrid Shadow Testing Scheme For Ray Tracing" Computer Aided Design, Elsevier Publishers BV., Barking, GB, vol. 21, No. 1, 1989, pp. 38–48.

Foley, J.D.; Van Dam, A.: "Computer Graphics" Oct. 23, 1990, Addison–Wesley, pp. 745–753.

* cited by examiner

Primary Examiner—Mark Zimmerman
Assistant Examiner—Erique L. Santiago
(74) Attorney, Agent, or Firm—Jordan and Hamburg LLP

(57) ABSTRACT

Polygons forming a shadow models are sorted into front-facing polygons facing in directions toward a viewpoint of a virtual camera and back-facing polygons facing in directions opposite from the viewpoint of the virtual camera, and a shadow image is created in pixels which are pixels corresponding to the front-facing polygons minus pixels corresponding to the back-facing polygons, thereby realistically and easily creating a shadow on the outer surface of a 3D model. Accordingly, in the case that part or all the 3D model such as a character is placed in a shadow of a mountain, a building or the like, a shadow can be realistically and easily created on the outer surface of the 3D model.

14 Claims, 4 Drawing Sheets

THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

The present invention relates to a three-dimensional (3D) image processing technique of applying a specified image processing to create a shadow image on a surface of a 3D model located in a simulated 3D space, which technique is applied, for example, to video game systems.

BACKGROUND OF THE INVENTION AND RELATED ART STATEMENT

In recent years, various game systems in which characters are displayed in a simulated 3D space generated on a monitor screen have been spread. Some of such game systems are known to simulate car race, skiing, surfing, motor-boating, snow boarding, skate boarding, etc.

In such games in which the characters move, the presence given by the games largely depend on how realistically changes in character images and background images resulting from the movement of the characters are expressed.

In a game system for such a game in which a character is moved in a simulated 3D space, a better presence can be given if a shadow to be thrown on the outer surface of an object such as a character by a light from a light source blocked by a mountain, a building or the like is created (shadowing). As a result, a game system having a rich ingenuity can be realized.

A conventional shadow creating method is such that an area is so set in a simulated 3D space as to correspond to a position and a size of a mountain, a building or the like that causes shadowing, and a propagating direction of rays from a light source, and if a reference point of an object such as a character is located in this area, a shadow is created on the entire outer surface of the object. It should be noted that a shadow model (shadow volume) is a polygon-model representation of such an area in the simulated 3D space as to create a shadow on the outer surface of an object when the object is located in this area.

However, according to the above method, even if a shadow is actually thrown on part of the object, i.e. part of the object is included in the shadow model, shadowing is either applied to the entire object or not applied at all. Therefore, no sufficient presence can be given.

SUMMARY OF THE INVENTION

In view of the above situation, an object of the present invention is to provide image processing method and apparatus for realistically and easily creating a shadow thrown on the outer surface of an object, a readable storage medium storing a 3D image processing program and a video game system.

In order to achieve the above object according to the present invention, a three-dimensional image processing apparatus for creating a shadow image on the outer surface of a 3D model using a shadow model formed by a plurality of polygons, comprises: a shadow model storage means for storing at least coordinates of vertices of the shadow model, a polygon sorting means for sorting the polygons forming the shadow model into front-facing polygons facing in directions toward a viewpoint of a virtual camera and back-facing polygons facing in directions opposite from the viewpoint of the virtual camera, and a shadow image creating means for creating the shadow image in pixels which are pixels corresponding to the front-facing polygons minus those corresponding to the back-facing polygons.

With this construction, the shadow image thrown on the outer surface of the 3D model is obtained by being created in the pixels which are pixels corresponding to the front-facing polygons of the shadow model minus pixels corresponding to the back-facing polygons. Thus, the shadow image thrown on the outer surface of the 3D model can be realistically and easily created.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
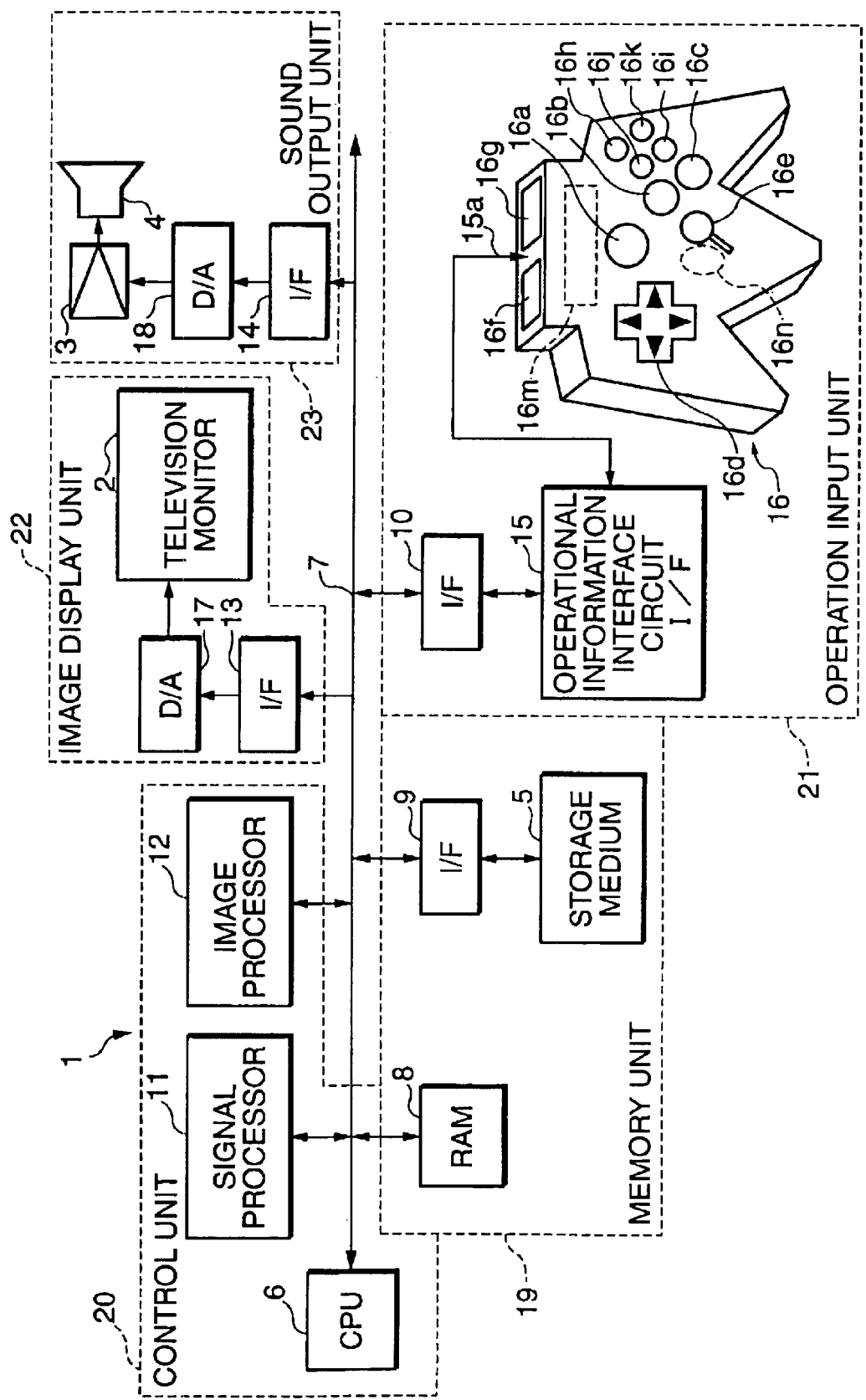
FIG. 1 is a block diagram showing one embodiment of a video game system according to the present invention.

FIG. 1 is a block diagram showing one embodiment of a video game system according to the present invention.

This game system 1 is provided with a main game unit, a television (TV) monitor 2 for outputting images of a game, an amplifying circuit 3 and a loudspeaker 4 for outputting sound effects and the like during a game, and a storage medium 5 storing game data including image data, sound data and program data. The storage medium 5 may be a so-called ROM cassette in which a ROM storing the game data and a program data of an operating system is contained in a plastic casing, an optical disk, a flexible disk. Depending on the mode of the game system 1, a built-in type ROM or the like may be used.

The main game unit is constructed such that buses 7 including address busses, data buses and control buses are connected with a CPU 6; a RAM 8, interface circuits 9, 10, a signal processor 11, an image processor 12, and interface circuits 13, 14 are connected with the buses 7; a controller 16 is connected with the interface circuit 10 via an operational information interface circuit 15; a digital-to-analog (D/A) converter 17 is connected with the interface circuit 13; and a D/A converter 18 is connected with the interface circuit 14.

A memory unit 19 is constructed by the RAM 8, the interface circuit 9 and the storage medium 5; a control unit 20 for controlling the progress of the game is constructed by the CPU 6, the signal processor 11 and the image processor 12; an operation input unit 21 is constructed by the interface circuit 10, the operational information interface circuit 15 and the controller 16; an image display unit 22 is constructed by the TV monitor 2, the interface circuit 13 and the D/A converter 17; and a sound output unit 23 is constructed by the amplifying circuit 3, the loudspeaker 4, the interface circuit 14 and the D/A converter 18.

The signal processor 11 mainly performs calculation of positions of characters in a simulated 3D sp ace, calculation to transform a position in the simulated 3D space to the one in a two-dimensional (2D) space, light source calculation, and reading and combination of various sound data.

The image processor 12 positions polygons forming an image to be formed in a display area of the RAM 8 and applies rendering such as texture mapping to these polygons based on the calculation result of the signal processor 11.

The controller 16 is provided with various buttons for selecting game contents, instructing the start of the game, and instructing actions, direction, etc. to a main character.

The mode of the game system 1 differs depending on its application. Specifically, the TV monitor 2, the amplifying circuit 3 and the loudspeaker 4 are separate from the main game unit in the case that the game system 1 is constructed for home use, whereas all the elements shown in FIG. 1 are contained as a unit in one casing in the case that the game system 1 is constructed for business use.

In the case that the game system 1 is constructed with a personal computer or a workstation as a core, the TV monitor 2 corresponds to a computer display, the image processor 12 corresponds to part of the game program data stored in the storage medium 5 or hardware on an extension board mounted on an extension slot of the computer, and the interface circuits 9, 10, 13, 14, the D/A converters 17, 18, and the operational information interface circuit 15 correspond to hardware on the extension board mounted on the extension slot of the computer. Further, the RAM 8 corresponds to a main memory of the computer or the respective areas of an extension memory.

A case where the game system 1 is constructed for home use is described below.

First, the operation of the game system 1 is briefly described. When a power switch (not shown) is turned on to activate the video game system 1, the CPU 6 reads image data, sound data and game program data from the storage medium 5 in accordance with the operating system stored in the storage medium 5. All or part of the read image data, sound data and game program data are stored in the RAM 8.

Thereafter, the game is proceeded by the CPU 6 in accordance with the game program data stored in the RAM 8 and contents of instructions given by a game player via the controller 16. In other words, commands as tasks for forming images and outputting sounds are suitably generated in accordance with contents of instructions given by the game player via the controller 16.

The signal processor 11 performs calculation of positions of characters in the 3D space (of course the same applies for the 2D space), a light source calculation, reading and combination of various sound data in accordance with these commands.

Subsequently, the image processor 12 writes the image data to be formed in the display area of the RAM 8 based on the calculation result of the signal processor 11. The image data written in the RAM 8 is supplied via the interface circuit 13 to the D/A converter 17, which then supplies the image data to the TV monitor 2 to display it as an image on the screen of the TV monitor 2 after converting it into an analog video signal.

Figure 2:
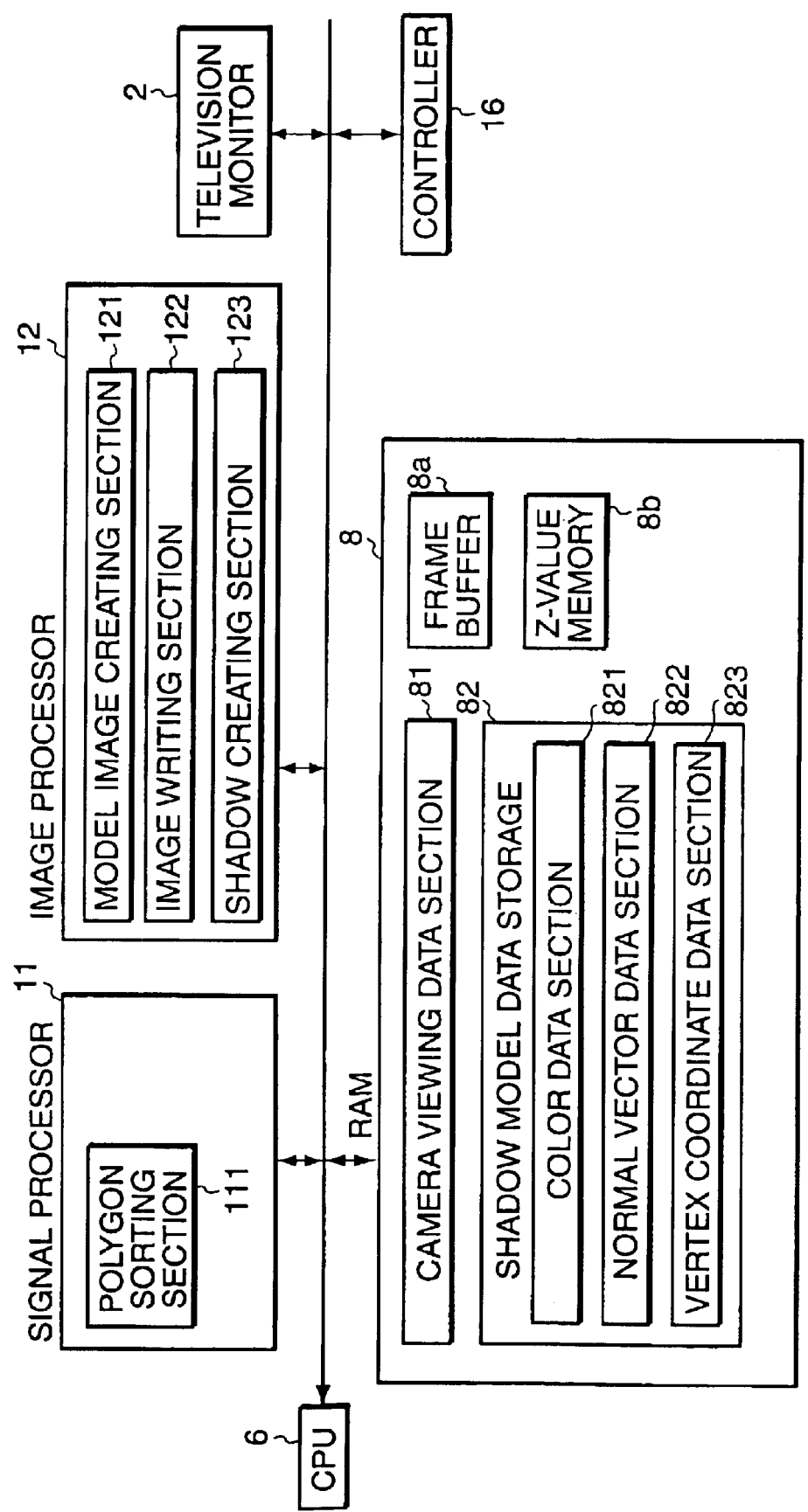
FIG. 2 is a block diagram showing an essential portion of a 3D image processing apparatus.

FIG. 2 is a block diagram showing an essential portion of a 3D image processing apparatus. The signal processor 11 includes a polygon sorting section 111 for sorting polygons forming a shadow model into front-facing polygons facing in directions toward a viewpoint of a virtual camera and back-facing polygons facing in directions opposite from the viewpoint of the virtual camera. The image processor 12 includes a model image creating section 121 for applying rendering to a model, an image writing section 122 for writing the image data obtained by rendering in a frame buffer 8a to be described later while being related to Z-values to be stored in a Z-value memory 8b, and a shadow creating section 123 for creating a shadow on the outer surface of a 3D model.

Here, a shadow model (shadow volume) is a polygon model expressing an area which is so set in the simulated 3D space as to correspond to a position and a size of a mountain, building or the like for which a shadow is to be created and a propagating direction of rays from a light source, etc. If an object such as a character is located in this area, a shadow is thrown onto the outer surface of this object.

The polygon sorting section 111 calculates inner products of normal vectors of the surfaces of the polygons forming the shadow model and a camera viewing vector, and sorts the respective polygons into back-facing polygons whose inner products are positive and front-facing polygons whose inner products are not positive.

The model image creating section 121 applies texture mapping and rendering to all the models except the shadow model located in the simulated 3D space to form an image of all the models except the shadow model.

The image writing section 122 writes the image formed by the model image creating section 121 in the frame buffer 8a in the form of frame color data which are color data of the respective pixels and writes Z-values, i.e. distances to the polygons corresponding to the respective pixels from the viewpoint of the virtual camera in the simulated 3D space, in the Z-value memory 8b.

The shadow creating section 123 creates a shadow image of the 3D model by subtracting the color data of the shadow model from the frame color data of the pixel stored in the frame buffer 8a for the pixels (shadow creating pixels) which are pixels corresponding to the front-facing polygons of the shadow model whose distances from the viewpoint of the virtual camera in the simulated three-dimensional space are smaller than the Z-value of the corresponding pixels minus pixels corresponding to the back-facing polygons of the shadow model whose distances from the viewpoint of the virtual camera in the simulated three-dimensional space are smaller than the Z-value of the corresponding pixels. In other words, the shadow image is created in pixels which are pixels corresponding to the back surfaces of the shadow model excluding from those corresponding to the front surfaces thereof.

The RAM 8 includes a camera viewing data section 81 for storing vector data representing the viewpoint and viewing direction of the virtual camera, and a shadow model data storage 82 for storing pieces of information on the shadow model. The frame buffer 8a is adapted to store the frame color data which are color data of each pixel of the image obtained by applying rendering, and a Z-value memory 8b is adapted to store distances Z between the viewpoint of the virtual camera and the polygons corresponding to the respective pixels in the simulated 3D space.

The shadow model data storage 82 is provided with a color data section 821 for storing the color data of the shadow model, a normal vector data section 822 for storing normal vectors of the respective polygons forming the shadow model, and a vertex coordinate data section 823 for storing the coordinates of the respective vertices of the respective polygons forming the shadow model.

Figure 3:
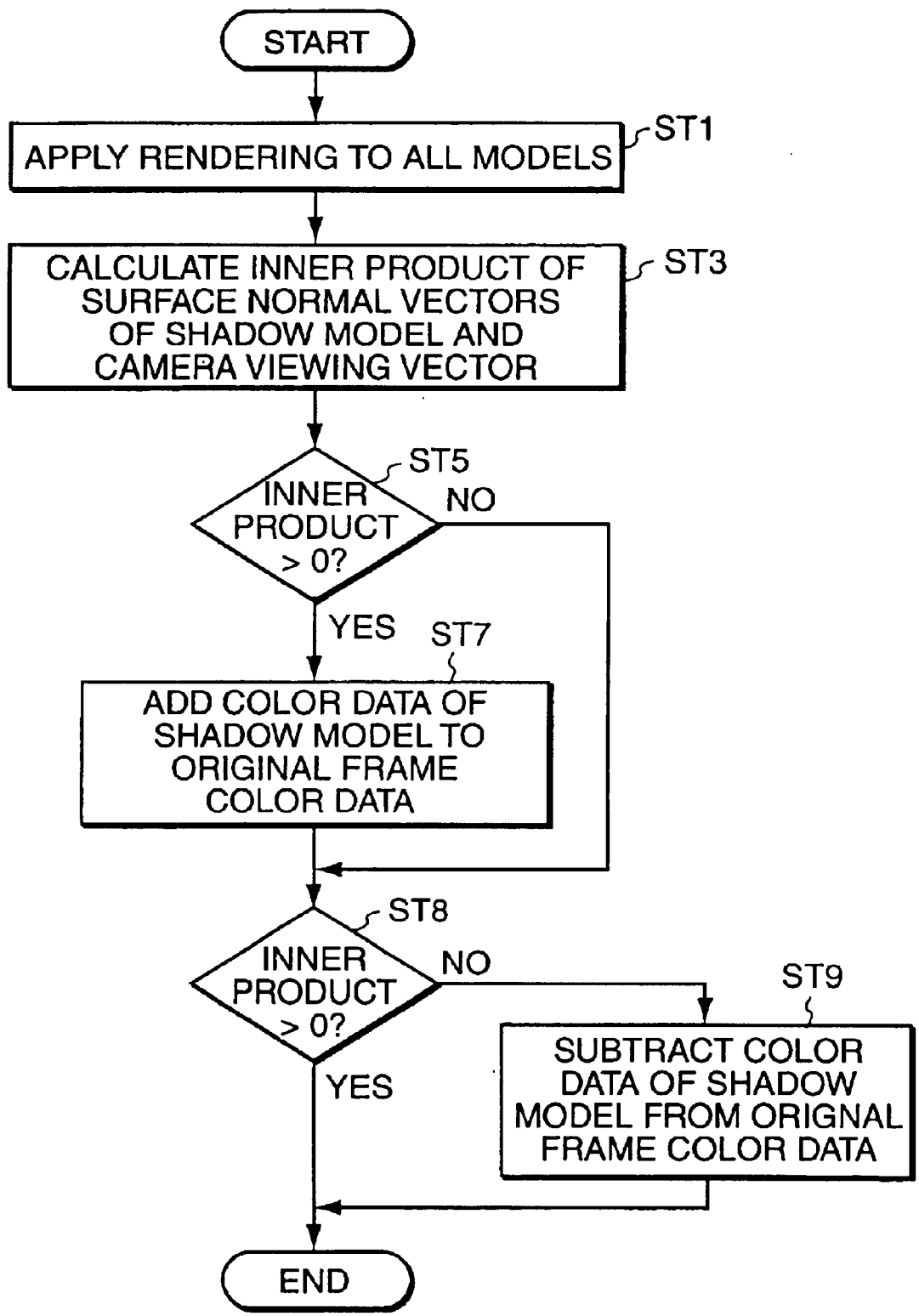
FIG. 3 is a flow chart showing a summary of a 3D image processing applied to display a shadow image on the outer surface of a 3D model located within a shadow model.

FIG. 3 is a flow chart showing a summary of a 3D image processing for displaying a polygon model located in the simulated 3D space on the monitor after applying rendering thereto and for applying an image processing to create a shadow image on the outer surface of a 3D model. First, the model image creating section 121 applies texture mapping and rendering to the respective models located in the simulated 3D space except a shadow model, thereby forming an image of all the models except the shadow model (Step ST1). The image writing section 122 writes color data of the respective pixels of this image in the frame buffer 8a and Z-values of the respective pixels thereof in the Z-value memory 8b. The color data of the respective pixels written in the frame buffer 8a are referred to as frame color data.

Subsequently, the polygon sorting section 111 calculates inner products of surface normal vectors of the respective polygons forming the shadow model and a camera viewing vector (Step ST3) and discriminates whether the calculated inner products are positive or not (Steps ST5, ST8). The polygons whose inner products are positive are discriminated as back-facing polygons while those whose inner products are not positive are discriminated as front-facing polygons. As is clear from a calculation procedure, the front-facing polygons are those facing in directions toward the viewpoint of the virtual camera and the back-facing polygons are those facing in directions opposite from the viewpoint of the virtual camera.

Subsequently, for each pixel to which the back-facing polygon is to be adhered, a distance between the back-facing polygon at this pixel position and the viewpoint of the virtual camera in the simulated 3D space and the Z-value of this pixel stored in the Z-value memory 8b are compared, and the color data of the shadow model is added to the frame color data of this pixel if the former is smaller than the latter (Step ST7). For each pixel to which the front-facing polygon is to be adhered, a distance between the front-facing polygon at this pixel position and the viewpoint of the virtual camera in the simulated 3D space and the Z-value of this pixel stored in the Z-value memory 8b are compared, and the color data of the shadow model is subtracted from the frame color data of this pixel if the former is smaller than the latter (Step ST9). Here, since the addition precedes, an excessive fall of the color data below a lower limit by the subtraction (carry down) can be prevented. It should be noted that the operations in Steps ST7 and ST9 are performed by the shadow creating section 123 and the data in the Z-value memory 8b are not rewritten thereby. The color data of the shadow model is subtracted from the frame color data at the positions of the pixels (shadow creating pixels) which are pixels corresponding to the front surfaces of the shadow model minus those corresponding to the back surfaces thereof, thereby creating a shadow image on the outer surface of the 3D model.

Figure 4:
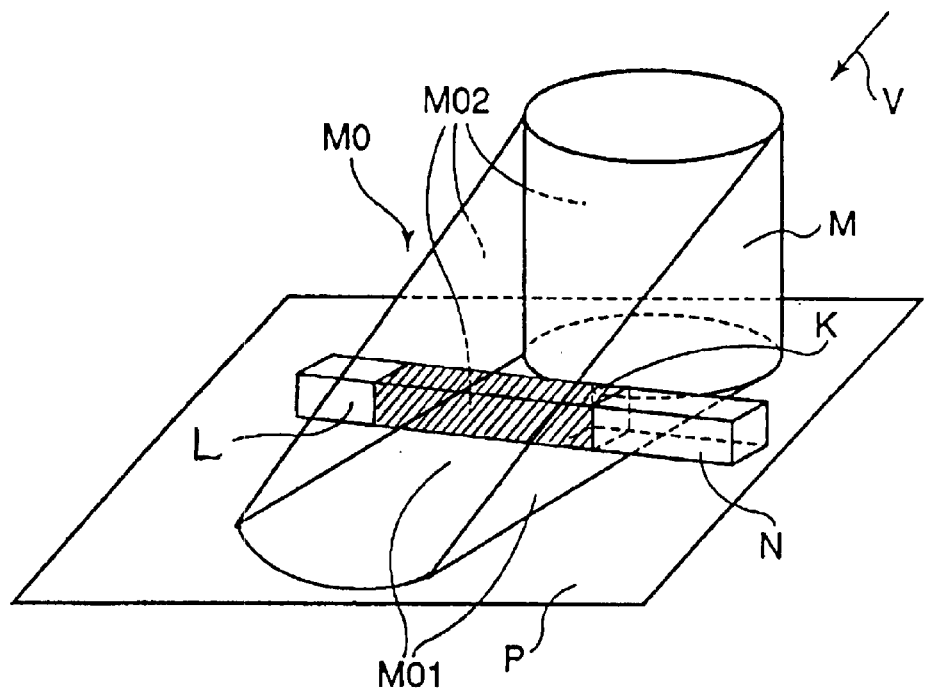
FIG. 4 is a diagram showing one example in which a shadow image is created on the outer surface of a 3D model partly located within a shadow mode.

FIG. 4 is a diagram showing one example in which a shadow image is created on the outer surface of a 3D model partly located within a shadow model. In the case that a cylindrical solid M is placed on a plane P and a light propagates in direction of a light source vector V, a shadow model M0 of the solid M is, for example, formed into a substantially triangular column as shown. The shadow model M0 is comprised of front-facing polygons M01 and back-facing polygons M02.

Figure 5:
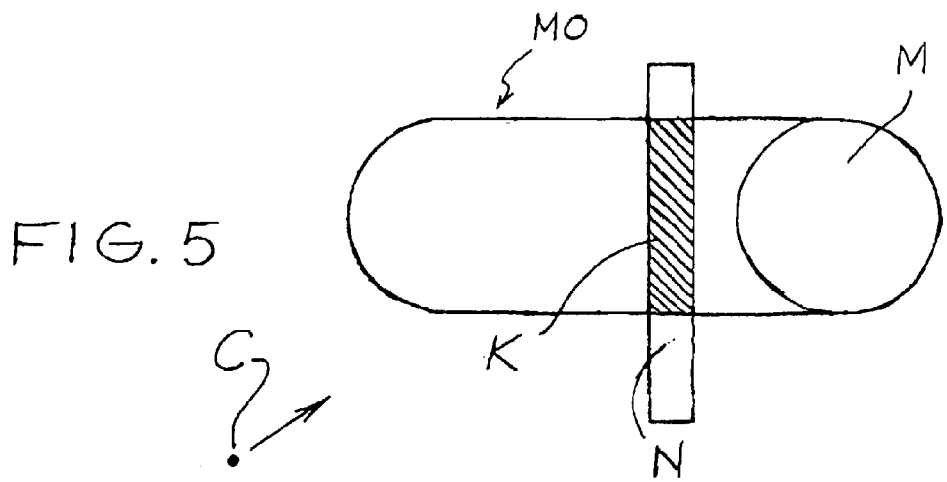
FIG. 5 is a plan view of the example of FIG. 4.
Figure 6:
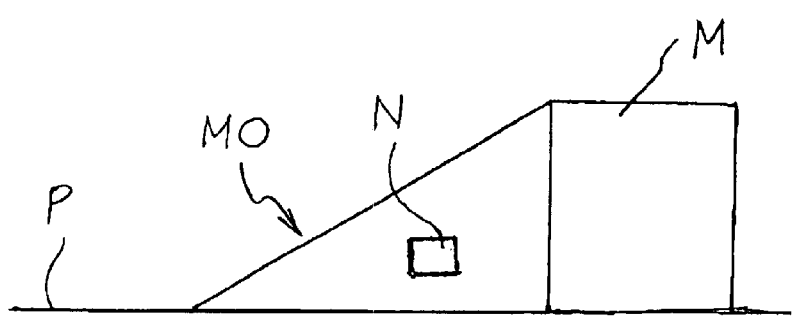
FIG. 6 is a side elevation of the example of FIG. 4.

As shown in FIG. 4 (FIGS. 5 and 6 representing plan and side views thereof, respectively, for showing relative location of a viewpoint C for the perspective view of FIG. 4), if part of a solid N in the form of a rectangular column is located within the shadow model M0, the front-facing polygons M01 are located more toward the viewpoint C of the virtual camera than the solid N, and most of the back-facing polygons M02 are located more toward the viewpoint than the solid N while part of the back-facing polygons M02 are located at a side of the solid N opposite from the viewpoint C of the virtual camera. Specifically, pixels where a shadow image K are formed are those of the pixels at the positions of the back-facing polygons defined as follows. For each of those pixels, a distance between the back-facing polygon at the position of this pixel and the viewpoint C of the virtual camera and the Z-value (distance between the solid M, N or the plane P and the viewpoint of the virtual camera) of this pixel stored in the Z-value memory 8b are compared, and the color data of the shadow model is not added to the frame color data of this pixel, since the former distance is larger than the latter. As shown in FIG. 4, shadow pixels, i.e. those of which form shadow image K are pixels corresponding to the front-facing polygons of the shadow model whose distances from the viewpoint of the virtual camera in the simulated three-dimensional space are smaller than the Z-values of the corresponding pixels, while excluding pixels corresponding to the back-facing polygons of the shadow model whose distances from the viewpoint of the virtual camera in the simulated three-dimensional space are smaller than the Z-values of the corresponding pixels. These excluded pixels which, as shown in FIG. 4, define a portion L of solid N which exits rearwardly of the shadow model, i.e., which is made up of pixels with a Z-value greater than a distance between the viewpoint C of the virtual camera and the back-facing polygon corresponding to the pixels, and therefore do not have a shadow cast thereupon.

The present invention may also be embodied as follows.

(A) Although there is only one shadow model in the foregoing embodiment, shadow images can be created in a similar procedure even if there are two or more shadow models. However, it is necessary to secure an area of the shadow model data 82 for the number of the shadow models. The more the shadow models, the more realistic an image can be made.

(B) Although the shadow model has the normal vectors of the polygons in the foregoing embodiment, it may have vertex vectors of the respective vertices of the polygons. The normal vector of the polygon can be calculated by, for example, adding and averaging the normal vectors of the respective vertices of the polygon.

(C) Although the shadow image is created by subtracting the color data of the shadow model from the frame color data for the pixels which are those corresponding to the front-facing polygons of the shadow model minus those corresponding to the back-facing polygons in the foregoing embodiment, the shadow image may be created by changing the frame color data of these pixels. In such a case, color tone can also be changed in addition to the density of the shadow.

(D) Although the shadow image is created by subtracting the color data of the shadow model from the frame color data for the pixels which are those corresponding to the front-facing polygons of the shadow model minus those corresponding to the back-facing polygons in the foregoing embodiment, the frame color data may be changed by a method for subtracting a predetermined value independent of the color data of the shadow model from the frame color data of the above pixels. According to this method, the predetermined value may be added to the frame color data of the pixels corresponding to the back-facing polygons of the shadow model after being subtracted from the frame color data of the pixels corresponding to the front-facing polygons of the shadow model or in a reversed procedure. In this case, it is not necessary to store the color data of the shadow model, and color tone can also be changed in addition to the density of the shadow.

(E) Although the shadow image is created by subtracting the color data of the shadow model from the frame color data for the pixels which are those corresponding to the front-facing polygons of the shadow model minus those corresponding to the back-facing polygons in the foregoing embodiment, the frame color data may be changed by a method for multiplying the frame color data of the above pixels by a predetermined value independent of the color data of the shadow model. According to this method, the frame color data of the pixels corresponding to the back-facing polygons of the shadow model may be divided by the predetermined value (e.g. 0.5) after the frame color data of the pixels corresponding to the front-facing polygons of the shadow model are multiplied by it or in a reversed procedure. In this case, it is not necessary to store the color data of the shadow model, and color tone can also be changed in addition to the density of the shadow.

(F) Although the shadow image is created by subtracting the color data of the shadow model from the frame color data for the pixels which are those corresponding to the front-facing polygons of the shadow model minus those corresponding to the back-facing polygons in the foregoing embodiment, the shadow image may be created by applying a specified semitransparent processing to these pixels. In this case, it is not necessary to store the color data of the shadow model.

(G) Although the color data of the shadow model is subtracted from the frame color data of the pixels corresponding to the back-facing polygons of the shadow model after being added to the frame color data of the pixels corresponding to the front-facing polygons of the shadow model in the foregoing embodiment, the procedure may be reversed. In such a case, since the addition precedes, an excessive fall of the color data below a lower limit by the subtraction (carry down) can be prevented.

(H) Although the color data of the shadow model is stored separately from the coordinates of the vertices in the foregoing embodiment, these data may be stored as vertex color data. In this case, the shadow model can be stored in a data structure similar to that of a usual polygon model.

(I) Although the shadow model data and other data are stored in the RAM 8 in the foregoing embodiment, they may be transferred from the storage medium 5 to the RAM 8 according to the progress of the game. This embodiment has an advantage that a necessary capacity of the RAM 8 can be reduced.

As described above, according to the present invention, the shadow image thrown on the outer surface of the 3D model can be obtained by creating the shadow image in the pixels which are pixels corresponding to the front-facing polygons of the shadow model minus pixels corresponding to the back-facing polygons. Thus, the shadow image thrown on the outer surface of the 3D model can be more realistically and easily created. Further, since the front-facing polygons and the back-facing polygons can be sorted out by calculating the inner products of the vectors, sorting can be easily realized.

In sum, a three-dimensional image processing apparatus for creating a shadow image on the outer surface of a 3D model using a shadow model formed by a plurality of polygons, comprises: a shadow model storage means for storing at least coordinates of vertices of the shadow model, a polygon sorting means for sorting the polygons forming the shadow model into front-facing polygons facing in directions toward a viewpoint of a virtual camera and back-facing polygons facing in directions opposite from the viewpoint of the virtual camera, and a shadow image creating means for creating the shadow image in pixels which are pixels corresponding to the front-facing polygons minus those corresponding to the back-facing polygons.

With this construction, the shadow image thrown on the outer surface of the 3D model is obtained by being created in the pixels which are pixels corresponding to the front-facing polygons of the shadow model minus pixels corresponding to the back-facing polygons. Thus, the shadow image thrown on the outer surface of the 3D model can be realistically and easily created.

In the aforementioned three-dimensional image processing apparatus, it is preferable that the shadow model storage means stored normal vectors of the respective polygons forming the shadow model, and the polygon sorting means sorts the respective polygon forming the shadow model into the front-facing polygons and the back-facing polygons based on whether an inner product of the normal vector of each polygon and a camera viewing vector representing a viewing direction of the virtual camera is a positive or negative value. With this construction, the polygon can be easily sorted into the front-facing polygons and the back-facing polygons by calculating the inner products of the vectors.

The aforementioned three-dimensional image processing apparatus may further comprise model image creating means for creating an image by applying rendering to a polygon model except the shadow model, and model image storage means for storing the image created by the model image creating means while relating frame color data which are color data of pixels to Z-values which are distances to the polygons corresponding to the respective pixels from the viewpoint of the virtual camera in a simulated three-dimensional space, wherein the shadow creating means changes the frame color data of the pixels stored in the model image storage means for shadow creating pixels which are pixels corresponding to the front-facing polygons of the shadow model whose distances from the viewpoint of the virtual camera in the simulated three-dimensional space are smaller than the Z-values of the corresponding pixels minus pixels corresponding to the back-facing polygons of the shadow model whose distances from the viewpoint of the virtual camera in the simulated three-dimensional space are smaller than the Z-values of the corresponding pixels. With this construction, an entire image including the shadow image created on the outer surface of the 3D model can be realistically and easily created, and the density and the like of the shadow can be changed by changing the frame color data.

In the aforementioned three-dimensional image processing apparatus, the shadow creating means can be set to subtract a predetermined value from the frame color data of the shadow creating pixels which are stored in the model image storage means. With this construction, an entire image including the shadow image created on the outer surface of the 3D model can be realistically and easily created, and the density and the like of the shadow can be changed by changing the predetermined value to be subtracted from the frame color data.

In the aforementioned three-dimensional image processing apparatus, wherein the shadow creating means may be set to multiply the frame color data of the shadow creating pixels which are stored in the model image storage means by a predetermined value. With this construction, an entire image including the shadow image created on the outer surface of the 3D model can be realistically and easily created, and the density and the like of the shadow can be changed by changing the predetermined value to multiply the frame color data.

In the aforementioned three-dimensional image processing apparatus, wherein the shadow model storage means may be set to store a single color data of the shadow model and the shadow creating means subtracts the color data of the shadow model from the frame color data of the shadow creating pixels which are stored in the model image storage means. With this construction, an entire image including the shadow image created on the outer surface of the 3D model can be realistically and easily created, and the density and the like of the shadow can be changed by increasing and decreasing the frame color data.

In the aforementioned three-dimensional image processing apparatus, the 3D model can be a character movable in a simulated three-dimensional space. With this construction, the shadow thrown on the outer surface of the movable character can be created, thereby enabling creation of realistic images.

In addition, the present invention also relates to a readable storage medium which stores a three-dimensional image processing program for creating a shadow image on the outer surface of a 3D model using a shadow model formed by a plurality of polygons. The stored program comprises the steps of: storing at least coordinates of vertices of the shadow model, sorting the polygons forming the shadow model into front-facing polygons facing in directions toward a viewpoint of a virtual camera and back-facing polygons facing in directions opposite from the viewpoint of the virtual camera, and creating the shadow images in pixels which are pixels corresponding to the front-facing polygons minus those corresponding to the back-facing polygons. According to this program, the shadow image thrown on the outer surface of the 3D model is obtained by being created in the pixels which are pixels corresponding to the front-facing polygons of the shadow model minus pixels corresponding to the back-facing polygons. Thus, the shadow image thrown on the outer surface of the 3D model can be realistically and easily created.

In the aforementioned readable storage medium, the normal vectors of the respective polygons forming the shadow model can be stored, and the polygon sorting processing can be performed to sort the respective polygon forming the shadow model into the front-facing polygons and the back-facing polygons based on whether an inner product of the normal vector of each polygon and a camera viewing vector representing a viewing direction of the virtual camera is a positive or negative value. According to this program, the polygon can be easily sorted into the front-facing polygons and the back-facing polygons by calculating the inner products of the vectors.

In the aforementioned readable storage medium, the program may further comprise a model image creating processing for creating an image by applying rendering to a polygon model except the shadow model, and a storing processing for storing the image created by the model image creating processing while relating frame color data which are color data of pixels to Z-values which are distances to the polygons corresponding to the respective pixels from the viewpoint of the virtual camera in a simulated three-dimensional space, wherein, during the shadow image creating processing, the frame color data of the pixels stored in the model image storage means are changed for shadow creating pixels which are pixels corresponding to the front-facing polygons of the shadow model whose distances from the viewpoint of the virtual camera in the simulated three-dimensional space are smaller than the Z-values of the corresponding pixels minus pixels corresponding to the back-facing polygons of the shadow model whose distances from the viewpoint of the virtual camera in the simulated three-dimensional space are smaller than the Z-values of the corresponding pixels. According to this program, an entire image including the shadow image created on the outer surface of the 3D model can be realistically and easily created, and the density and the like of the shadow can be changed by changing the frame color data.

Furthermore, in the aforementioned readable storage medium, a predetermined value can be subtracted from the frame color data of the shadow creating pixels which are stored in the model image storage means during the shadow image creating processing. According to this program, an entire image including the shadow image created on the outer surface of the 3D model can be realistically and easily created, and the density and the like of the shadow can be changed by changing the predetermined value to be subtracted from the frame color data.

Moreover, in the aforementioned readable storage medium, the frame color data of the shadow creating pixels which are stored in the model image storage means can be multiplied by a predetermined value during the shadow image creating processing. According to this program, an entire image including the shadow image created on the outer surface of the 3D model can be realistically and easily created, and the density and the like of the shadow can be changed by changing the predetermined value to multiply the frame color data.

Moreover, in the aforementioned readable storage medium, a single color data of the shadow model can be stored, and the color data of the shadow model can be subtracted from the frame color data of the shadow creating pixels which are stored in the model image storage means during the shadow image creating processing. According to this program, an entire image including the shadow image created on the outer surface of the 3D model can be realistically and easily created, and the density and the like of the shadow can be changed by increasing and decreasing the frame color data.

Yet moreover, in the aforementioned readable storage medium, the 3D model can be a character movable in a simulated three-dimensional space. According to this program, the shadow thrown on the outer surface of the movable character can be created, thereby enabling creation of realistic images.

The present invention also relates to a three-dimensional image processing method for creating a shadow image on the outer surface of a 3D model using a shadow model formed by a plurality of polygons. The method comprising the steps of: storing at least coordinates of vertices of the shadow model, sorting the polygons forming the shadow model into front-facing polygons facing in directions toward a viewpoint of a virtual camera and back-facing polygons facing in directions opposite from the viewpoint of the virtual camera, and creating the shadow images in pixels which are pixels corresponding to the front-facing polygons minus those corresponding to the back-facing polygons. According to this method, the shadow image thrown on the outer surface of the 3D model is obtained by being created in the pixels which are pixels corresponding to the front-facing polygons of the shadow model minus pixels corresponding to the back-facing polygons. Thus, the shadow image thrown on the outer surface of the 3D model can be realistically and easily created.

In addition, the present invention also relates to a video game system which comprises: one of the forms of the aforementioned three-dimensional image processing apparatuses, an image display means for displaying an image including a shadow image on the outer surface of a 3D model, a program storage means for storing a game program data, and an externally operable operation means, wherein the three-dimensional image processing apparatus displays images on the image display means in accordance with the game program data. Such a video game system can realistically and easily create the shadow image thrown on the outer surface of the 3D model using the shadow model.

This application is based on Japanese patent application serial no. 2000-290170 filed in Japanese Patent Office on Sep. 25, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A three-dimensional image processing apparatus for creating a shadow image on an outer surface of a 3D model using a shadow model formed by a plurality of polygons, comprising:

shadow model storage means for storing at least coordinates of vertices of the shadow model;

polygon sorting means for sorting the polygons forming the shadow model into front-facing polygons facing in directions toward a viewpoint of a virtual camera and back-facing polygons facing in directions opposite from the viewpoint of the virtual camera;

model image creating means for creating an image by applying rendering to a polygon model except the shadow model;

model image storage means for storing the image created by the model image creating means while relating frame color data, which are color data of pixels, to Z-values, which are distances to the polygons corresponding to the respective pixels, from the viewpoint of the virtual camera in a simulated three-dimensional space; and shadow creating means for creating the shadow image in pixels which are pixels corresponding to the front-facing polygons by changing the frame color data of the pixels stored in the model image storage means for shadow creating pixels which are:

a first set of pixels corresponding to the front-facing polygons of the shadow model whose distances from the viewpoint of the virtual camera in the simulated three-dimensional space are smaller than the Z-values of the corresponding pixels, and excluding a second set of pixels corresponding to the back-facing polygons of the shadow model whose distances from the viewpoint of the virtual camera in the simulated three-dimensional space are smaller than the Z-values of the corresponding pixels;

said shadow creating means including means for performing an operation on said frame color data of first set of pixels which is either one of addition and subtraction of a predetermined value thereby creating modified frame color data, and for performing an additional operation on said modified frame color data of said second set of pixels which is an opposite operation of said one of addition and subtraction using said predetermined value, whereby said operation alters initial frame color data values of said first set of pixels as indicative of being the shadow creating pixels, and said second set of pixels is effectively excluded as said shadow creating pixels by a cancellation of said first operation by performance of said additional operation equal and opposite in value thereto.

2. A three-dimensional image processing apparatus according to claim 1, wherein the shadow model storage means stores normal vectors of the respective polygons forming the shadow model, and the polygon sorting means sorts the respective polygon forming the shadow model into the front-facing polygons and the back-facing polygons based on whether an inner product of the normal vector of each polygon and a camera viewing vector representing a viewing direction of the virtual camera is a positive or negative value.

3. A three-dimensional image processing apparatus according to claim 1, wherein the shadow creating means subtracts the predetermined value from the modified frame color data of the shadow creating pixels which are stored in the model image storage means.

4. A three-dimensional image processing apparatus according to claim 1, wherein the shadow creating means multiplies the frame color data of the shadow creating pixels which are stored in the model image storage means by a predetermined value.

5. A three-dimensional image processing apparatus according to claim 1, wherein the shadow model storage means stores a single color data of the shadow model and the shadow creating means subtracts the color data of the shadow model from the modified frame color data of the shadow creating pixels which are stored in the model image storage means.

6. A three-dimensional image processing apparatus according to claim 1, wherein the 3D model is a character movable in a simulated three-dimensional space.

7. A readable storage medium storing a three-dimensional image processing program for creating a shadow image on the outer surface of a 3D model using a shadow model formed by a plurality of polygons, the program comprising the steps of:

storing at least coordinates of vertices of the shadow model;

sorting the polygons forming the shadow model into front-facing polygons facing in directions toward a viewpoint of a virtual camera and back-facing polygons facing in directions opposite from the viewpoint of the virtual camera;

creating an image by applying rendering to a polygon model except the shadow model;

storing the image created by the model image creating means while relating frame color data, which are color data of pixels, to Z-values, which are distances to the polygons corresponding to the respective pixels, from the viewpoint of the virtual camera in a simulated three-dimensional space; and creating the shadow images in pixels which are pixels corresponding to the front-facing polygons by changing the frame color data of the pixels stored in the model image storage means for shadow creating pixels which are:
- a first set of pixels corresponding to the front-facing polygons of the shadow model whose distances from the viewpoint of the virtual camera in the simulated three-dimensional space are smaller than the Z-values of the corresponding pixels, and
- excluding a second set of pixels corresponding to the back-facing polygons of the shadow model whose distances from the viewpoint of the virtual camera in the simulated three-dimensional space are smaller than the Z-values of the corresponding pixels;

said step of creating including performing an operation on said frame color data of first set of pixels which is either one of addition and subtraction of a predetermined value thereby creating modified frame color data, and performing an additional operation on said modified frame color data of said second set of pixels which is an opposite operation of said one of addition and subtraction using said predetermined value, whereby said operation alters initial frame color data values of said first set of pixels as indicative of being the shadow creating pixels, and said second set of pixels is effectively excluded as said shadow creating pixels by a cancellation of said first operation by performance of said additional operation equal and opposite in value thereto.

8. A readable storage medium according to claim 7, wherein normal vectors of the respective polygons forming the shadow model are stored, and the polygon sorting processing is performed to sort the respective polygon forming the shadow model into the front-facing polygons and the back-facing polygons based on whether an inner product of the normal vector of each polygon and a camera viewing vector representing a viewing direction of the virtual camera is a positive or negative value.

9. A readable storage medium according to claim 7, wherein the predetermined value is subtracted from the modified frame color data of the shadow creating pixels which are stored in the model image storage means during the shadow image creating processing.

10. A readable storage medium according to claim 7, wherein the frame color data of the shadow creating pixels which are stored in the model image storage means are multiplied by a predetermined value during the shadow image creating processing.

11. A readable storage medium according to claim 7, wherein a single color data of the shadow model is stored, and the color data of the shadow model is subtracted from the modified frame color data of the shadow creating pixels which are stored in the model image storage means during the shadow image creating processing.

12. A readable storage medium according to claim 7, wherein the 3D model is a character movable in a simulated three-dimensional space.

13. A three-dimensional image processing method for creating a shadow image on the outer surface of a 3D model using a shadow model formed by a plurality of polygons, the method comprising the steps of:
- storing at least coordinates of vertices of the shadow model;
- sorting the polygons forming the shadow model into front-facing polygons facing in directions toward a viewpoint of a virtual camera and back-facing polygons facing in directions opposite from the viewpoint of the virtual camera;
- creating an image by applying rendering to a polygon model except the shadow model;
- storing the image created by the model image creating means while relating frame color data, which are color data of pixels, to Z-values, which are distances to the polygons corresponding to the respective pixels, from the viewpoint of the virtual camera in a simulated three-dimensional space; and
- creating the shadow images in pixels which are pixels corresponding to the front-facing polygons by changing the frame color data of the pixels stored in the model image storage means far shadow creating pixels which are:
  - a first set of pixels corresponding to the front-facing polygons of the shadow model whose distances from the viewpoint of the virtual camera in the simulated three-dimensional space are smaller than the Z-values of the corresponding pixels, and
  - excluding a second set of pixels corresponding to the back-facing polygons of the shadow model whose distances from the viewpoint of the virtual camera in the simulated three-dimensional space are smaller than the Z-values of the corresponding pixels;

said step of creating including performing an operation on said frame color data of first set of pixels which is either one of addition and subtraction of a predetermined value thereby creating modified frame color data, and performing an additional operation on said modified frame color data of said second set of pixels which is an opposite operation of said one of addition and subtraction using said predetermined value, whereby said operation alters initial frame color data values of said first set of pixels as indicative of being the shadow creating pixels, and said second set of pixels is effectively excluded as said shadow creating pixels by a cancellation of said first operation by performance of said additional operation equal and opposite in value thereto.

14. A video game system, comprising:

a three-dimensional image processing apparatus for creating a shadow image on the outer surface of a 3D model using a shadow model formed by a plurality of polygons, including:
- shadow model storage means for storing at least coordinates of vertices of the shadow model;
- polygon sorting means for sorting the polygons forming the shadow model into front-facing polygons facing in directions toward a viewpoint of a virtual camera and back-facing polygons facing in directions opposite from the viewpoint of the virtual camera;
- model image creating means for creating an image by applying rendering to a polygon model except the shadow model;
- model image storage means for storing the image created by the model image creating means while relating frame color data, which are color data of pixels, to Z-values, which are distances to the polygons corresponding to the respective pixels, from the viewpoint of the virtual camera in a simulated three-dimensional space; and
- shadow image creating means for creating the shadow image in pixels which are pixels corresponding to the front-facing polygons by changing the frame color data of the pixels stored in the model image storage means for shadow creating pixels which are:

a first set of pixels corresponding to the front-facing polygons of the shadow model whose distances from the viewpoint of the virtual camera in the simulated three-dimensional space are smaller than the Z-values of the corresponding pixels, and excluding a second set of pixels corresponding to the back-facing polygons of the shadow model whose distances from the viewpoint of the virtual camera in the simulated three-dimensional space are smaller than the Z-values of the corresponding pixels;

said shadow image creating means including means for performing an operation on said frame color data of first set of pixels which is either one of addition and subtraction of a predetermined value thereby creating modified frame color data, and for performing an additional operation on said modified frame color data of said second set of pixels which is an opposite operation of said one of addition and subtraction using said predetermined value, whereby said operation alters initial frame color data values of said first set of pixels as indicative of being the shadow creating pixels, and said second set of pixels is effectively excluded as said shadow creating pixels by a cancellation of said first operation by performance of said additional operation equal and opposite in value thereto:

image display means for displaying an image including a shadow image on the outer surface of a 3D model;

program storage means for storing a game program data; and externally operable operation means;

wherein the three-dimensional image processing apparatus displays images on the image display means in accordance with the game program data.

* * * * *